(12) United States Patent
Mestanogullari et al.

(10) Patent No.: US 10,637,808 B2
(45) Date of Patent: *Apr. 28, 2020

(54) ELECTRONIC MESSAGING MANAGEMENT

(71) Applicant: Chicago Mercantile Exchange Inc., Chicago, IL (US)

(72) Inventors: Baris Mestanogullari, Chicago, IL (US); James Bradley, Chicago, IL (US); Dan Judson, Chicago, IL (US); Rick Yang, Chicago, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 42 days.

This patent is subject to a terminal disclaimer.

(21) Appl. No.: 16/012,933

(22) Filed: Jun. 20, 2018

(65) Prior Publication Data

US 2018/0302356 A1 Oct. 18, 2018

Related U.S. Application Data

(63) Continuation of application No. 14/579,078, filed on Dec. 22, 2014, now Pat. No. 10,033,670.

(51) Int. Cl.
| | |
|---|---|
| *G06F 15/16* | (2006.01) |
| *H04L 12/58* | (2006.01) |
| *G06Q 10/10* | (2012.01) |
| *G06Q 40/04* | (2012.01) |
| *H04L 29/08* | (2006.01) |

(52) U.S. Cl.
CPC ........... *H04L 51/046* (2013.01); *G06Q 10/10* (2013.01); *G06Q 10/107* (2013.01); *G06Q 40/04* (2013.01); *H04L 51/063* (2013.01); *H04L 67/02* (2013.01); *H04L 67/04* (2013.01); *H04L 67/10* (2013.01); *H04L 67/28* (2013.01); *H04L 67/2809* (2013.01); *H04L 67/2823* (2013.01)

(58) Field of Classification Search
CPC ..... H04L 51/046; G06Q 10/10; G06Q 10/107
USPC ........................................... 709/206
See application file for complete search history.

(56) References Cited

U.S. PATENT DOCUMENTS

| | | | |
|---|---|---|---|
| 6,910,186 B2 | 6/2005 | Kim | |
| 7,603,413 B1 * | 10/2009 | Herold | G06Q 10/10 709/204 |
| 7,738,897 B2 | 6/2010 | Tillet et al. | |
| 2001/0003202 A1 | 6/2001 | Mache et al. | |

(Continued)

FOREIGN PATENT DOCUMENTS

WO 0165334 A2 9/2001

OTHER PUBLICATIONS

Extended European Search Report, from EP 15201738.0, dated May 10, 2016, EP.

*Primary Examiner* — Atta Khan
(74) *Attorney, Agent, or Firm* — Lempia Summerfield Katz LLC

(57) ABSTRACT

Methods, devices, and systems for facilitation of electronic message management involve receiving a message generated from a user of one communication system, augmenting the message with data indicative of the user, communicating the augmented message to a second communication system, and presenting the message to a user of the second communication system such that the message is separate from other received messages not having data indicative of the first user.

19 Claims, 4 Drawing Sheets

(56) References Cited

U.S. PATENT DOCUMENTS

| | | | |
|---|---|---|---|
| 2004/0019637 A1* | 1/2004 | Goodman | H04L 51/04 709/204 |
| 2004/0228531 A1* | 11/2004 | Fernandez | H04L 51/04 382/187 |
| 2005/0021445 A1* | 1/2005 | Caro | G06Q 10/107 705/37 |
| 2008/0016017 A1* | 1/2008 | Biazetti | G06N 20/00 706/45 |
| 2008/0294735 A1* | 11/2008 | Muntermann | H04L 51/14 709/206 |
| 2011/0154224 A1 | 6/2011 | Bates et al. | |
| 2011/0213846 A1* | 9/2011 | Sarin | H04L 12/1822 709/206 |

* cited by examiner

ELECTRONIC MESSAGING MANAGEMENT

REFERENCE TO RELATED APPLICATIONS

This application is a continuation under 37 C.F.R. § 1.53(b) of U.S. patent application Ser. No. 14/579,078 filed Dec. 22, 2014 now U.S. Pat. No. 10,033,670, the entire disclosure of which is incorporated by reference in its entirety.

BACKGROUND

A financial instrument trading system, such as a futures exchange, referred to herein also as an "Exchange", such as the Chicago Mercantile Exchange Inc. ("CME"), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network. These "electronic" marketplaces are an alternative to pit or open outcry based trading systems whereby the traders, or their representatives, all physically stand in a designated location, i.e. a trading pit, and trade with each other via oral and hand based communication. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic exchanges, while efficient and immediate, do not necessarily provide or include the immediate and available communication between traders provided by traditional, pit or open outcry based trading environments. For example, electronic exchanges generally do not match the price improvement capabilities of an open outcry exchange where floor brokers and market makers can handle large and complex orders through in-person or face-to-face communication. Communication delays can prevent market makers and others from changing their quotes or orders fast enough to reflect market conditions, thus forcing many market participants to use ancillary methods of communication, such as telephones, outside the electronic market environment to communicate.

Systems may make use of these external modes of communication, such as instant messaging services, but they remain dependent on limitations on communication abilities imparted by external entities that may limit effective and efficient communication between parties. For example, some external communication service providers may limit the number or rate of messages communicated using the external provider. As such, communication between parties may prove unreliable, e.g. it may be slowed, or even interrupted for a period of time.

Accordingly, there is a need for a system and method that can provide real-time interactive communication capabilities for electronic exchanges in a manner that will facilitate the communication of information between participants of the electronic exchange, as well as users of external communication service providers.

DETAILED DESCRIPTION

Figure 1:
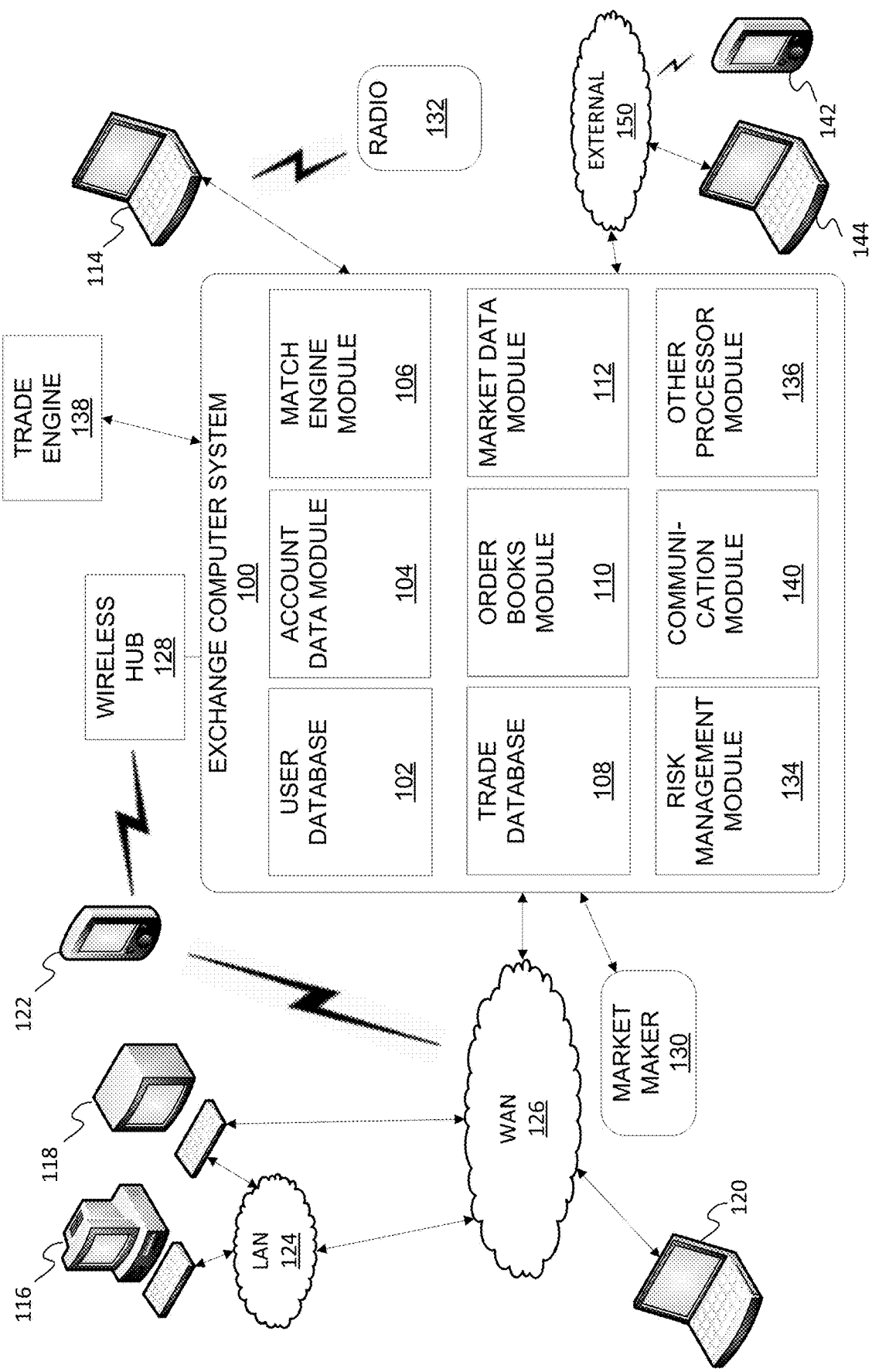
FIG. 1 depicts a system for facilitating messaging management in a market environment.

The disclosed embodiments relate to communicative messaging capabilities that allow trading parties, such as market makers, traders and other market participants, to communicate within an electronic trading system and which may allow for more efficient communication before, during and after trade execution. Further, the disclosed embodiments provide an environment in which a group of market participants may engage in communication with other market participants and/or clients via a combination of internal and external messaging systems. The communication environment may facilitate interactive communication in real-time regarding markets associated therewith and/or other topics. For example, communications between parties may be conveyed as instantaneously as possible so as to allow substantially contemporaneous communication regarding changes in the markets as those changes are realized by a trading system. Further, communications may be primarily managed using internal communication systems and interactive interfaces that communicate with external communication systems. As such, the internal communication system may group multiple market participants as well as other internal system users, and provide a consolidated interface with external communication systems. In this way, an interactive communication experience may facilitate the interaction of multiple market participants and/or market participant clients. This consolidated interface for a group of market participants allows for more efficient control of interactions with external communication systems, as well as more efficient operation of internal systems, particularly as it relates to the management and communication of messages.

The following embodiments may facilitate communication between market participants and/or parties to a trade for the purpose of negotiating, arranging for and/or consummating a trading transaction there between, or for other reasons. For example, a broker using an external communication system or service, such as an instant messaging service which offers real-time text transmission over the internet, may wish to communicate with a particular trading desk in the electronic market. There may be multiple traders that participate and/or interact with this trading desk. These traders may be participants in an internal communication system such as a many-to-many forum, i.e. a message sent by one participant is transmitted or otherwise broadcast to all other participants, for communication between the multiple traders of the trading desk. A virtual presence may be established to participate in the external communication system of the broker such that messages sent by the broker are received by the virtual presence, and vice versa. The virtual presence may then receive a message sent by the broker, and forward the message to the trading desk's internal communication system. Further, to facilitate the organization of messages for the trading desk's internal communication system, information relating to the broker may be added to the message prior to forwarding. For example, the message may be augmented with the broker's name, or other identifying information such as the broker's external communication system username. As such, the trading desk's internal communication system may use the identifying information to organize the presentation of messages such that this particular message, as well as other messages sent by this broker, may be presented separately from other messages provided to the trading desk's internal communication system.

The following embodiments may relate to any electronic messaging, including electronic message packets communicated using any wired and/or wireless communications network, including the internet. The Internet, in particular, is a worldwide network which primarily uses the Transport Control Protocol and Internet Protocol ("TCP/IP") to permit the exchange of information including electronic message packets. At a higher level, the Internet supports several applications protocols including the Hypertext Transfer Protocol ("HTTP") for facilitating the exchange of HTML/World Wide Web ("WWW") content, File Transfer Protocol ("FTP") for the exchange of data files, electronic mail exchange protocols, Telnet for remote computer access and Usenet ("NNTP" or Network News Transfer Protocol) for the collaborative sharing and distribution of information. It will be appreciated that the disclosed embodiments may relate to messages communicated using the TCP protocol, however the disclosed embodiments are applicable to messages communicated using many different transport protocols both now and later developed. For example, the enclosed embodiments may relate to the use of User Datagram Protocol ("UDP") techniques to communicate messages. Further, chat rooms, or other consolidated communication forums may be generated and/or provided for users based on transmitted and/or received electronic messages. Any chat services, clients, and/or protocols may be used to generate a forum. For example, Adium, Kopete, or other clients and/or protocols may be used.

In an embodiment, a virtual presence may be considered an automated system referred to as a bot. Once the bot is started, any incoming message from an external and/or public network based communication system is relayed to an internal many-to-many communication forum, such as a chat room, with metadata containing information about the external user that generated the message. Interactions between chat room participants and the chat room may be managed by a software/hardware client coupled with computing devices used by particular participants. This client may parse the metadata of the message and manage the messages of the chat room accordingly. For example, for each external user conversing with the bot's public messaging presence, a new tab may be generated for a conversation between that external user and all the internal members of the chat room. This allows the bot and the messaging client to properly switch and carry on several different communication threads of conversation all through one chat room, without having to create a new room per conversation. Such message management may facilitate communication and efficient computer resource usage by reducing the resources needed to manage the operations of multiple chat rooms. Also, the methods and systems described above and herein take advantage of internal message management and the consolidated interface with external systems to improve message delivery tracking and reduce errors in the transmission of messages between external and internal messaging systems.

In a further example, the bot may be called a Private Network Point ("PNPoint"). This bot may log on to an external/public network with a given identification information. The bot also logs on to an internal network, such as the CHICAGO MERCANTILE EXCHANGE ("CME") Private Network, and joins a multi-user chat room. This room is populated with the chatroom participants which may communicate messages among each other using the chat room.

In this example, a bot for a particular trading desk, XyzTradingOilDesk, is configured to log on to the external messenger service network and a CME Private Network ("PN") with the logon 'XyzOilDesk'. The PNPoint bot will also join a chatroom called 'XyzOilDesk' on PN. This multi-user chat room is configured to allow communication between 10 traders that work on that desk. Those 10 users log on to PN with an instant messaging client, configured to operate as described herein. Subsequently, a broker 'JoeBroker' sends a message to XyzOilDesk on the external messenger service network using an external the external messenger service network instant messaging client. Upon the receipt of the message, the PNPoint bot adds metadata identifying JoeBroker to the message and sends it to the PN room. The private network instant messaging client identifies this metadata in the message, and if there is not already an ongoing conversation with JoeBroker, the instant messaging client opens a new tab showing 'XyzOilDesk-JoeBroker' on the tabs title. Any subsequent messages from JoeBroker and any responses from the internal bot members will be shown in this tab. The technique may be repeated for each user that contacts the XyzOilDesk. For example, when another user messages XyzOilDesk on the external messenger service network, a new tab for that conversation is opened within the instant messaging client as described above.

In accordance with aspects of the disclosure, systems and methods are disclosed for electronic messaging management. The disclosed embodiments are preferably implemented with computer devices and computer networks, such as those described with respect to FIG. 4, that allow users, e.g. market participants, to exchange information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading and/or electronic message management is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100. Also, the exchange computer system 100 may include a communication module 140 that may facilitate messaging or other communication between the market maker 130 and/or the computer devices 114, 116, 118, 120 and 122 via wide area network 126 and/or local area network 124.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names, passwords, a preferred contact method, and contact information for the preferred contact method. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A communication module 140 may be included to, among other things, facilitate communication between traders and/or market makers as well as external contacts of traders and/or market makers. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

In an embodiment, the communication module 140 may include communication system that may provide communication between terminals or other computer systems 114, 116, 118, 120, 122. The communication module 140 may also provide for communication between the other computer systems 114, 116, 118, 120, 122 and computer systems 142, 144 that are connected to an external network 150.

The communication module 140 may include a message relay or management component that is configured to receive a message sent by an external messaging service user associated with an external network computer system 142, 144. The message may be sent to a virtual presence in an external messaging service operated in a one-to-one communication environment also connected to the external network 150. The communication module 140 may also be operable to augment the message with data indicating the user that generated the message. The communication module 140 may also be operable to relay the augmented message to an internal messaging service operated by the communication module 140. The internal messaging service may be operated as a many-to-many communication forum having a plurality of forum participants, such as users associated with computer systems 114, 116, 118, 120, 122. Further, the virtual presence may also be included as a participant in the communication forum. In an embodiment, the many-to-many communication forum is operational to broadcast messages within the communication forum to all, or a number, of the participants. Also, computer systems 114, 116, 118, 120, 122 coupled or in communication with the communication module 140 may include a messaging client operable to receive a broadcast of the augmented message from the many-many forum. The messaging client may also be operable to present the augmented message to at least one forum participant of the plurality of participants together with other received augmented messages having data indicative of the user of the external messaging system and separate from other received messages not having data indicative of the user.

The trading and communication network environment shown in FIG. 1 includes exemplary computer devices 114, 116, 118, 120, 122, 142, 144 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a Ti line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data or other messages from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the Exchange computer system 100 further includes a message management module 140 which may implement the disclosed mechanisms for managing electronic messages sent between an exchange and/or a plurality of communication system participants. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 2:
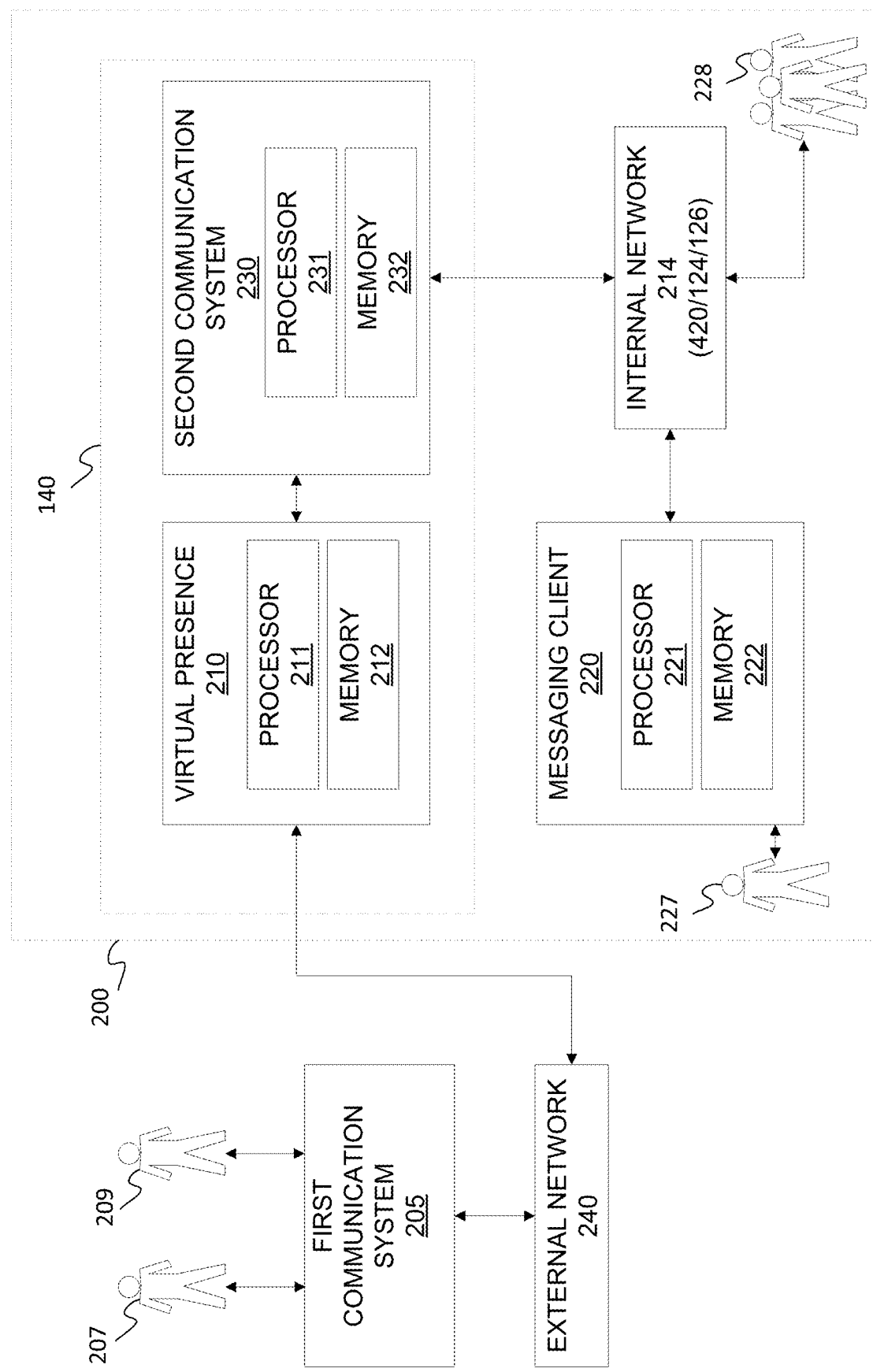
FIG. 2 depicts an embodiment of electronic message management.

FIG. 2 depicts a block diagram of a communication module 140 according to one embodiment, which in an exemplary implementation, is implemented as part of the exchange computer system 100 described above.

The embodiments described herein utilize trade related messages such as mass quote messages, individual order messages, cancellation messages, as well as communicative messaging between parties or entities to coordinate and communicate information. The trading entity may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

FIG. 2 also shows a system 200 for management of communication of market and communicative messages to a plurality of market participants via a network 214 which, as described above, may be the network 420 described below or network 124 or 126 described above, which may be implemented as a communication module 140 as described above. The system 200 may involve functionality to facilitate the organization and management of messages exchanged between trading parties or participants of a market as well as clients and/or parties not directly in communication with the exchange computer system 100. It will be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the message format and/or protocols described in U.S. Pat. Nos. 7,831,491, 8,745,147, and U.S. Patent Publication No. 2005/0096999 A1, all of which are incorporated by reference herein in their entirety. Further, the disclosed market and communicative message management system may be implemented using an open message standard implementation, such as FIX or FIX/FAST, by an Exchange-provided API, or any combination thereof.

The internal communication system 200 includes at least one processor 211, 221, 231 and at least one memory 212, 222, 232 coupled therewith and included as various modules or components of the internal communication system 200, which may be implemented as processor 402 and memory 404 as described below with respect to FIG. 4. The processors 211, 221, 231 are shown distinct processors, but may be implemented as a single processor configured for multiple operations. Further, the system may involve multiple processors 211, 221, 231 which may operate in a distributed processing environment such that processing resources are distributed between the available processors. For example, the virtual presence 210 and the second communication system 230 may share a processor 211 or 231 or the processing requirements may be distributed between multiple available processors. Also, the virtual presence 210 and the second communication system 230 may share a memory 212 or 232. The system 200 further includes communication module 140 and at least one messaging client 220 communicatively coupled by an internal network 214, which may be implemented as the networks 420 as described below with respect to FIG. 4. The messaging client 220 may be coupled with one or more users or participants 227, 228 of the internal communication system 200. For example, each of the users or participants 227, 228 may be associated with a respective exemplary messaging client 220. Also, multiple users may use a single messaging client 220. Such users 227, 228 of the internal network 214 and second communication system 230 may be considered internal users, whereas users of the external network 240, as well as systems based therein, may be considered external users 207, 209. In an embodiment, the communication module may include a virtual presence 210 and a communication system 230. Thus, an internal user 227 may communicate with external users 207, 209 using the internal communication system.

In an embodiment, the first communication system 205 may be operated in a one-to-one communication environment or mode such that messages generated therein are communicated between a single sender and a single recipient. Such communication may be as instantaneous as possible and/or in real-time. For example, real-time communication may involve the communication of messages within a predictable time after a user has initiated a transmission of the message, which may be synchronous or asynchronous, but is limited primarily by the communication speed capabilities of the computer/electronic components involved in the communication of the message from an originator to a recipient. Also, the second communication system 230 may be operated in a many-to-many communication environment or mode, such as a multi-user chatroom or forum, such that a message communicated therein from any participant of the forum is broadcast or otherwise available to the other participants of the forum. Such communication may also be instantaneous and/or in real-time. As such, the virtual presence 210 may facilitate the communication of messages from a single external user 207 of a first communication system 205 and a group of internal users 227, 228 of a second communication system 230. Further, a message provided to the second communication system 230 by any one 227 of the group of participants 227, 228 may be transmitted to the single external user 207 of the first communication system 205.

The virtual presence 210 may be in communication with another communication system 205 using an external network 240. This communication system 205 may have several users 207, 209 that communicate messages using the communication system 205. In an embodiment, the virtual presence may provide a presence in both communication systems 205, 230 such that the virtual presence may receive messages from, and send messages to, users and/or participants of both communication systems 205, 230. Providing a presence may involve disclosing identification and/or authentication information to the communication systems 205, 230 such that the virtual presence 210 is indicated as present in one or both of the communication systems 205, 230. Further, the virtual presence 210 is able to send and/or receive messages from external users 207, 209 when the presence is established. As such, external users 207, 209 may be able to identify the virtual presence 210 within a first communication system 205, then generate and send messages to the virtual presence 210. The virtual presence 210 may then be configured to receive and further process the received messages so that the messages may be provided to the messaging client 220 and users associated therewith 227.

In an embodiment, the communication between a first user 207 of a first communication system 205 and a second user 227 of a second communication system 230 may be facilitated. For example, as indicated in FIG. 2, the virtual presence 210 includes a processor 211. The processor 211 of the virtual presence 210 may be configured to participate as a third user of both the first and the second communication systems 205, 230. The processor 211 may also be configured to receive a first message from the first user 207 via the first communication system 205. The message may be directed to the third user. The processor may then save the first message in a memory 212 of the virtual presence 212. The processor 211 may also be configured to augment the received first message with data indicative of the first user 207, such as the first user's first communication system 205 username, internet address, name, external network and/or first communication system 205 names, and/or other identifying information. Also, the augmenting may be by any technique operable to add or associate the identifying information with the message. For example, metadata may be added to the message that includes the identifying information. Also, existing metadata of the message may be modified to indicate the identifying information.

The processor 211 may then be configured to transmit the augmented message to the second communication system 230. The second communication system 230 may then provide the message to users and/or participants of the second communication system 230. The message may be provided using any technique. For example, the message may be broadcast to multiple messaging clients 220 associated with a plurality of users 227, 228 of the second communication system 230.

The processor 221 of the messaging client 220 may be configured to receive the augmented first message via the second communication system 230. The processor 221 may be configured to identify and interpret the first user 207 from the augmented data of the first message. Also, the messaging client 220 may provide an interface operative to facilitate interaction between the second user 227 and the second communication system 230. This interface may be provided by the processor 221 of the messaging client. The interface may be configured to present the augmented first message to the second user 227 together with other received augmented messages having data indicative of the first user 207, and separate from the other received messages not having data indicative of the first user 207. Similar messaging clients may be used by other users 228 to access messages of the second communication system 230.

The processor 221 of the messaging client 220 may also be configured to receive via the interface a second message directed to the first user 207. The second message may be generated by the internal user 227 in response to the first message using the messaging client 220. The processor 221 may also be configured to augmenting the second message with data indicative of the first user 207. The processor 221 may then transmit the augmented second message to the second communications system 230 for communication to the users thereof 228 as well as the virtual presence 210. The processor 211 of the virtual presence may be configured to receive the augmented second message from the second communications system 230. The processor 211 may also be configured to identify the first user 207 from the augmented data of the second message. The processor 211 may also be configured to transmit, triggered by the detection of the augmented data indicative of the first user 207 in the augmented second message, the augmented second message to the first user 207 via the first communications system 205. The processor 211 may also be configured to transmit the augmented second message to multiple users 207, 209 of the first communication system. In an embodiment, the processor 211 may be configured to modify the received augmented message to allow for use in the first communication system 205. For example, the processor 211 may be configured to modify the received augmented second message to remove the data indicative of the first user 207 therefrom.

The processor 221 of the messaging client may also be configured to receive, via the interface, a second message not directed to any user of the first communication system 205. Such message may also be transmitted, by the processor 221, to the second communications system 230 for communication to the users thereof 228. The processor 211 of the virtual presence 210 may be configured to receive the second message, from the second communications system 230, and ignore the second message, based on the lack of data identifying a user of the first communications system 205, the received second message.

Figure 3:
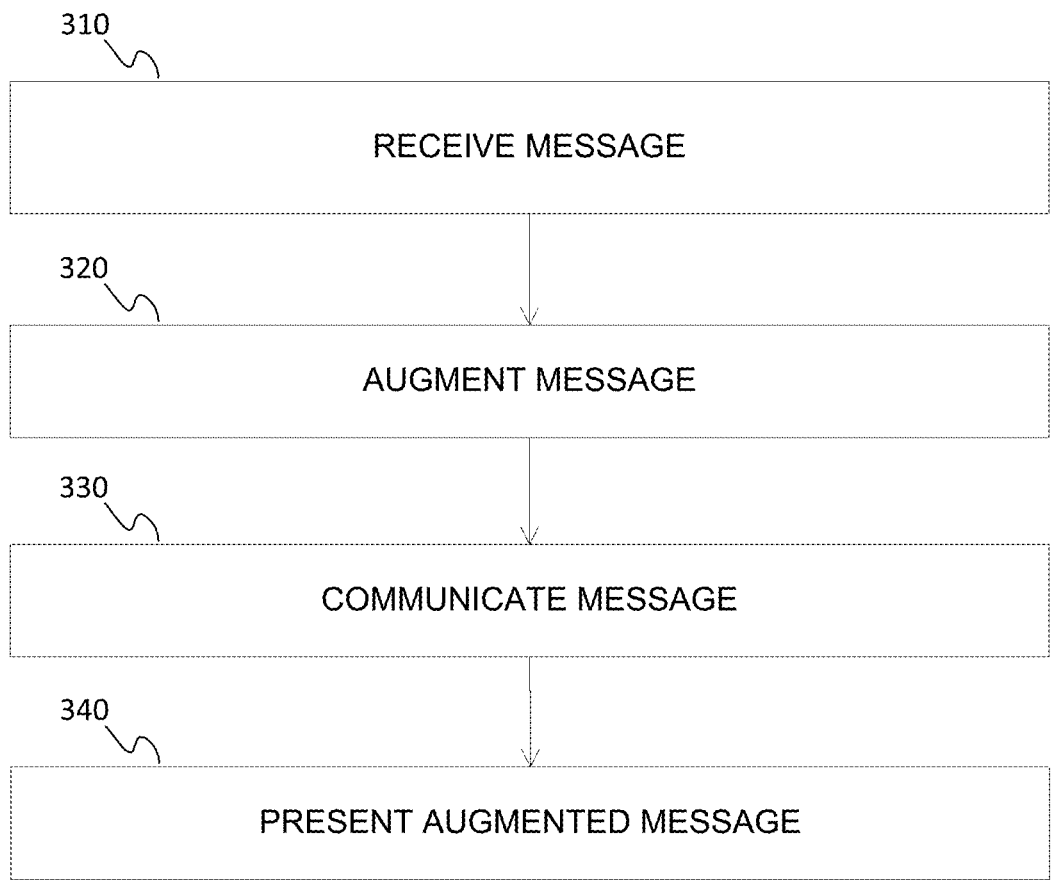
FIG. 3 depicts a block diagram of embodiments for electronic message management.

FIG. 3 depicts a flow chart showing operation of the internal system 200 of FIG. 2. In particular FIG. 3 shows a computer implemented method for managing messages. The operation includes receiving a message from a user of a first communication system (Block 310), augmenting the message with data indicative of the first user (Block 320), communicating the message to a second communication system (Block 330), and presenting the augmented message to a second user of the second communication system (Block 340). Additional, different, or fewer indicated acts may be provided. The indicated acts may be performed in the order shown or other orders. The indicated acts may also be repeated.

In an embodiment, a third user may be established as a user of, and/or participate in, both the first and the second communication systems. The third user may be a virtual presence, such as the virtual presence 210 described with respect to FIG. 2. The third user may receive a message sent from the first user using the first communication system.

A communication system may be any communication system operable to transmit and/or communicate messages between communication system users, such as the first communication system 205 or the second communication system 230 described with respect to FIG. 2. Further, the communication system may operate using any technique or standard to facilitate the communication of messages. For example, a communication system may communicate real-time text or other message transmissions over the Internet or other network. A communication system may be a one-to-one, many-to-many, or any other permutation of communication abilities between users. A communication system operating in a one-to-one environment may provide bi-directional communicating between two parties. For example, messages sent by a single user will be received by a single user. A communication system may also operate in a many-to-many environment, such as a multi-cast transmission environment wherein an individual user of the communication system can send single messages to multiple other users of the communication environment at the same time. For example, a chatroom or a multi-user communication forum may provide that a message generated in the forum by one of the participants is broadcast, or otherwise made available to all the other participants in the forum simultaneously and/or in real-time.

In an embodiment, the first communication system operates in a one-to-one environment wherein the third user is a virtual presence in the one-to-one environment. Upon receipt of the message from the first user, the third user may determine information indicative of the first user of the first communication system. For example, the message may be received from a channel opened in the first communication system for communication between the first user and the third user. This channel may have data that indicates a username in the first communication system for the first user. The third user, such as the virtual presence, may then augment the message with text characters indicating this username.

The message may be augmented using any technique. For example, metadata of the message may be changed to indicate the first user, or metadata may be added that indicates the first user. The data indicative of the first user may also be appended to the body of the message, and/or be included with a separate file that is associated with the message. The file containing the data indicative of the first user. For example, a table in a database or other data structure may associate a particular message with the first user.

The message may be communicated to a second communication system (Block 330). The communication may be through any communicative technique such as transmission or other data transfer operable to provide the content and the augmented data of the message to the second communication system. In an embodiment, the second communication system is operated in a many-to-many environment having a group of participants. In this embodiment, the augmented message that is communicated to the second communication system may be further communicated by the second communication system to the participants of the forum. Such communication may be effected through a broadcast and/or other multi-user transmission of the message.

A participant, or user, of the second communication system may use a messaging client to interact with the second messaging system. The messaging client may be any device operable to interact with the second communication system such that messages generated in or on the client may be communicated to other participants of the second communication system via the second communication system, such as the messaging client 220 described with respect to FIG. 2. The messaging client may provide an interface operative to facilitate interaction between a user and the second communication system. The messaging client may also receive the augmented first message via the second communication system.

Once received, a message may be presented to the user of the second communication system (Block 340). In an embodiment involving a messaging client, the messaging client may be configured to present the augmented first message to the user in a manner separate from other messages received from the second messaging system that do not contain data indicative of the first user that provided the message to the first communication system.

In an embodiment, a messaging client may organize groups of messages in conversation threads. A messaging client may also organize groups of messages by category, topic, and/or other distinguishing characteristic of a group of messages. Further, the messages may be organized using any technique. For example colors, folders, or any other grouping technique which conveys a relationship between the messages. Such a messaging client may determine the existence of a conversation thread associated with the user indicated by the augmented data of the received augmented message and determine whether a conversation thread associated with the first user exists. When it is determined that the conversation thread does not exist, triggering, based on the receipt of the message, a generation of the conversation thread associated with the external messaging service user. The conversation thread may be generated within the client and presented using the interface. Alternatively, when it is determined that the conversation thread exists, adding the received message to the existing conversation thread. Conversation threads may be distinguished using any technique. For example, individual conversation threads may be organized using a tabbed form structure such that a selection of a tab will indicate an active conversation thread. Further, active conversation threads may be displayed in any manner to distinguish active threads from inactive threads. For example, highlighting of active threads or the hiding of messages related to inactive threads may be used.

The method may also provide messages from the second user of the second communication system to the first user of the first communication system. For example, the second user may generate a message responsive to the first message. The responsive message may be augmented with data indicative of the first user, communicated to the second messaging system wherein a virtual presence detects the augmented data of the second message and communicates the message to the first user via the first communication system. In such an embodiment, the second communication system may be a many-to-many communication system, and as such, the second communication system may also broadcast the message to the other participants of the many-to-many environment. In this way, other participants may be made aware of a participant's response to the first communication system user's message. Also, multiple participants may respond to the original message. In this example, each of the participants may have a messaging client that organizes all of the messages in a message thread such that multiple responses from different participants may be displayed in the same thread. Also, a virtual presence may relay response messages from the participants such that the particular messages indicate the particular participant that provided the response. Alternatively, the virtual presence may strip the responses of any data that indicates which particular participant generated the response message. As such, the user of the first communication system may not be able to identify which particular participant generated a response message.

Also, the method may be repeated. For example, the method may involve receiving additional messages from other users of the first communication system. In an embodiment, a second message sent by a second external messaging service user may be received by a virtual presence. The second receive message may be augmented with data indicative of the second user and relayed to the second communication system. The second communication system may then broadcast the second message to participants in the second communication system. Thereafter, the broadcast message may be received by a messaging client and augmented data may be identified and used to determine the second user. The messaging client may then determine the existence of a conversation thread associated with the second user indicated by the augmented data. When it is determined that the second conversation thread does not exist the messaging client may trigger, based on the receipt of the broadcast second message, a generation of the conversation thread associated with the second user. Alternatively, when it is determined that the conversation thread exists, the messaging client may add the message to the determined conversation thread. Further, threads for the first user and the second user of the first communication system may be displayed at the same time on the same display. The first conversation thread grouping messages associated with the first user, and the second conversation thread grouping messages associated with the second user. In an embodiment, both conversation threads may be displayed in a selectable tab based format, wherein a selection of a tab associated with one of the conversation threads designates the associated conversation thread as active. Further, active threads may be displayed in a highlighted manner to differentiate from inactive threads.

Figure 4:
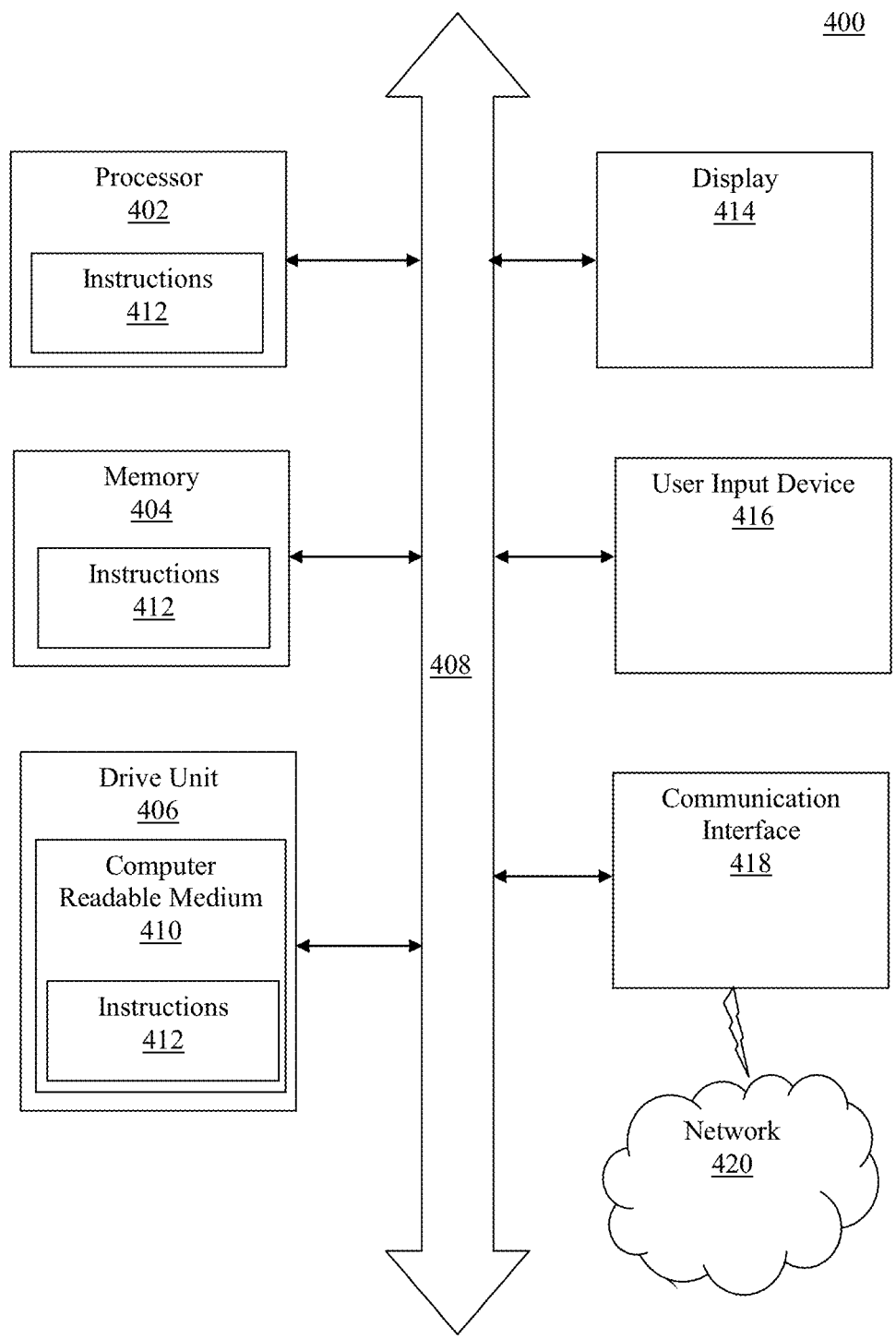
FIG. 4 shows an illustrative embodiment of a general computer system for electronic message management.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement embodiments for electronic message management.

For example, the instructions 412 may be operable when executed by the processor 402 to cause the computer 400 to facilitate communications between a first user of a first communications system operative to communicate one or more messages sent by a user thereof to another identified user thereof and a second user of a second communications system operative to communicate one or more messages from a user thereof to all other users thereof, participate as a third user of both the first and second communications systems. The instructions may be operable to facilitate by receiving a first message from the first user directed to the third user via the first communications system, augmenting the received first message with data indicative of the first user, transmitting the augmented first message to the second communications system for communication to all users thereof, providing an interface operative to facilitate interaction between the second user and the second communications system, receiving the augmented first message via the second communications system, and presenting, via the interface, the augmented first message to the second user together with other received augmented messages having data indicative of the first user and separate from other received messages not having data indicative of the first user.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly. In an embodiment, the communication interface 418 may be configured to communicate electronic message packets through the network 420 to a common destination.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a reconfigurable logic device or an ASIC (application specific integrated circuit). As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"-somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory. In an embodiment, the processors 211, 221, 231 shown in FIG. 2 may be implemented using an FPGA or an ASIC. For example, the receiving, augmenting, communicating, and/or presenting may be implemented using the same FPGA.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method of facilitating communications between a first communication network and a second communication network, wherein the first communication network is configured as a one-to-one communication environment such that messages generated therein are communicated between a single sender and a single recipient and the second communication network is configured as a many-to-many communication environment, such that a message communicated therein from a client of any of a plurality of participants is broadcast or otherwise available to the clients of the others of the plurality of participants, the method comprising:
    receiving, by a processor of a virtual presence coupled with both the first and second communication networks and operative to relay messages therebetween, a message sent by a user of the first communication network, the message directed to a financial transaction of the user, wherein the first communication network is not otherwise coupled with the second communication network;
    augmenting, by the processor of a virtual presence, the message with data relating to the user;
    communicating, by the processor of the virtual presence, the augmented message to the second communication network;
    determining, by a processor of each client of the second communication network, the existence of a conversation thread associated with the user indicated by the augmented data, wherein:
        when it is determined that the conversation thread does not exist, triggering, based on the receipt of the augmented message, a generation, by the processor of the client, of the conversation thread, and
        when it is determined that the conversation thread exists, adding, by the processor of the client, the augmented message to the conversation thread; and wherein the conversation thread is presented via the client to the participant separate from other conversations presented thereto which are not associated with the user.

2. The computer implemented method of claim 1, further comprising:
    modifying, by the processor of the client, the received augmented second message to remove the data indicative of the first user therefrom.

3. The computer implemented method of claim 1, wherein the first communication network is operated as a network external to the second communication network.

4. The computer implemented method of claim 1, wherein the client is a messaging client.

5. The computer implemented method of claim 1, wherein the first communication network is configured as an email service.

6. The computer implemented method of claim 1, wherein the first communication network is configured as an instant message service.

7. The computer implemented method of claim 1, wherein the data relating to the user comprises a name of the user.

8. The computer implemented method of claim 1, wherein the data relating to the user comprises a network identifier of the first communication network.

9. The computer implemented method of claim 1, wherein augmenting comprises augmenting the metadata of the message.

10. A computer implemented method of communicating a message between a plurality of external messaging service users coupled with a first communications network and an internal messaging service user coupled with a second communications network, wherein the first communication network is configured as a one-to-one communication environment such that messages generated therein are communicated between a single one of the plurality of external messaging service users and a single other of the plurality of external messaging service users and the second communication network is configured as a many-to-many communication environment, such that a message communicated therein from a messaging client of any of a plurality of users of the internal messaging service is broadcast or otherwise available to the messaging clients of the others of the plurality of users, the method comprising:
    receiving, by a processor of a virtual presence coupled with both the first and second communications networks and operative to relay messages therebetween, a first message sent by a user of the plurality of users of the external messaging service, the first message directed to a financial transaction of the user, wherein the first communication network is not otherwise coupled with the second communication network;
    augmenting, by the processor of the virtual presence, the first message with data indicating the user of the messaging service;
    relaying, by the processor of the virtual presence, the augmented first message to the internal messaging service for broadcast via the second communication network to each messaging client of the plurality of users of the internal messaging service;
    receiving, by a processor of each messaging client coupled with the second communications network, a broadcast of the augmented first message from the internal messaging service via the second communications network; and determining, by the processor of the messaging client, the existence of a conversation thread associated with the user of the external messaging service indicated by the augmented data, wherein:
  when it is determined that the conversation thread does not exist, triggering, based on the receipt of the broadcasted augmented first message, a generation, by the processor of the messaging client, of the conversation thread associated with the external messaging service user, and
  when it is determined that the conversation thread exists, adding, by the processor of the messaging client, the augmented first message to the conversation thread; and
  wherein the conversation thread is presented via the messaging client to the user of the internal messaging service separate from other conversations presented thereto which are not associated with the user of the external messaging service.

11. The computer implemented method of claim 10, further comprising:
  communicating, by the processor of the messaging client, a second message generated by a particular user of the plurality of users to the internal messaging service via the second communications network, the second message sent in response to the message sent by the user of the external messaging service and including data indicating the user of the external messaging service;
  receiving, by the processor of the virtual presence, the second message via the second communications network;
  detecting, by the processor of the virtual presence, the data indicating the user of the external messaging service; and
  communicating, by the processor of the virtual presence, the second message to the user of the external messaging service using the external messaging service via the first communications network.

12. The computer implemented method of claim 10, further comprising:
  communicating, by the processor of the messaging client, a third message generated by a particular user of the plurality of users of the internal messaging service via the second communications network the third message not directed to any of the plurality of users of the external messaging service;
  receiving, by the processor of the virtual presence, the third message via the second communications network; and
  ignoring, by the processor of the virtual presence, the third message based on the lack of data identifying any user of the external messaging serviced.

13. The computer implemented method of claim 10, further comprising:
  communicating, by the processor of the messaging client, a fourth message generated by a particular user of the plurality of users of the internal messaging service to the internal messaging service via the second communications network, the fourth message sent in response to the message sent by the user of the external messaging service and including data indicating the plurality of users of the external messaging service;
  receiving, by the processor of the virtual presence, the fourth message via the second communications network;
  detecting, by the processor of the virtual presence, the data indicating the plurality of users of the external messaging service; and
  communicating, by the processor of the virtual presence, the fourth message to the plurality of users using the messaging service via the first communications network.

14. The computer implemented method of claim 10, wherein the first communication network is configured as an email service.

15. The computer implemented method of claim 10, wherein the first communication network is configured as an instant messaging service.

16. The computer implemented method of claim 10, wherein the data indicating the user further comprises a network identifier of the first communication network.

17. The computer implemented method of claim 10, wherein augmenting comprises augmenting the metadata of the first message.

18. A system for communicating a message between a plurality of external messaging service users coupled with a first communications network and an internal messaging service user coupled with a second communications network, wherein the first communication network is configured as a one-to-one communication environment such that messages generated therein are communicated between a single sender and a single recipient and the second communication network is configured as a many-to-many communication environment, such that a message communicated therein from a client of any of a plurality of users is broadcast or otherwise available to the clients of the others of the plurality of users, the system comprising:
  a virtual presence device coupled between the first and second communications networks and operative to relay messages therebetween, wherein the first communication network is not otherwise coupled with the second communication network, and configured to:
    receive a message sent by an external messaging service user via the messaging service and first communications network to a virtual presence operated by the virtual presence device, the message relating to a financial transaction of the user of the external messaging service,
    augment the received message with data indicating the user of the external one to one messaging service, and
    relay, via the second communications network, the augmented first message to the internal messaging service for broadcast to the plurality of users; and
  a messaging client device coupled with the second communications network and internal messaging service and configured to:
    present the augmented message to each user of the plurality of users of the internal messaging service together with other received augmented message having data indicative of the user of the external messaging service and separate from other received messages not having data indicative of the user of the external messaging service.

19. The system of claim 18, wherein the first communication network is configured as an instant messaging service.

* * * * *